455-7 SR
E4819 OR 3,047,678
SEARCH ROOM

July 31, 1962 D. G. W. INGRAM 3,047,678

TELECOMMUNICATION SYSTEMS

Filed Feb. 16, 1959 3 Sheets-Sheet 1

INVENTOR
DEREK GEORGE WOODWARD INGRAM
BY Kirschstein, Kirschstein & Ottinger
ATTORNEYS July 31, 1962 D. G. W. INGRAM 3,047,678

TELECOMMUNICATION SYSTEMS

Filed Feb. 16, 1959 3 Sheets-Sheet 2

INVENTOR

DEREK GEORGE WOODWARD INGRAM

BY Kirschstein, Kirschstein & Ottinger

ATTORNEYS

INVENTOR
DEREK GEORGE WOODWARD INGRAM
BY Kirschstein, Kirschstein & Ottinger
ATTORNEYS United States Patent Office 3,047,678

Patented July 31, 1962

3,047,678
TELECOMMUNICATION SYSTEMS

Derek George Woodward Ingram, Harrow, England, assignor to The General Electric Company Limited, London, England Filed Feb. 16, 1959, Ser. No. 793,394
Claims priority, application Great Britain Feb. 18, 1958
8 Claims. (Cl. 179—175.31)

This invention relates to telecommunication systems.

More particularly, the invention is concerned with telecommunication systems of the kind employing one or more relay stations which each have one or more electric signal amplifiers to which negative feedback is applied, the relay stations being coupled in a chain between two terminal stations by radio links, cable links or other transmission links so that electric message signals may be passed between the terminal stations over a transmission channel and, when so passed, are amplified by the amplifiers at the relay stations.

An electric signal amplifier to which negative feedback is applied is hereinafter referred to as a negative feedback amplifier.

In connection with a telecommunication system of the kind specified above, it is desirable to have a supervisory arrangement whereby, in the event of a fault arising in the chain, information representing at least the approximate location of the faulty equipment is supplied to one of the terminal stations.

It is an object of the present invention to provide a telecommunication system of the kind specified having an improved supervisory arrangement for automatically indicating the location of at least a faulty negative feedback amplifier.

According to the present invention, in a telecommunication system of the kind specified, the relay station, or at least one of the relay stations if there are more than one, is provided with means to inject a signal of predetermined amplitude into the amplifier circuit of a negative feedback amplifier which is in the transmission channel between the terminal stations, the signal being at least characteristic of the relay station and the position in the amplifier circuit of that amplifier, at which the signal is arranged to be injected, being such that the level of that signal which is supplied to the transmission link connected to the output of the negative feedback amplifier increases as the gain of the amplifier circuit decreases and at a higher rate than the rate at which the amplification of message signals by the negative feedback amplifier is reduced as the said gain decreases, and the terminal station that is arranged to receive signals passed over the said channel is provided with means which is adapted to respond to an increase in level of the characteristic signal received thereby, which increase is relative to a predetermined reference level, and to thus indicate that at the relay station of which that signal is characteristic the gain of the amplifier circuit of the negative feedback amplifier in the transmission channel has decreased.

Preferably the characteristic signal is arranged to be injected into the output of the amplifier circuit of the negative feedback amplifier.

It may be arranged that the level of the characteristic signal injected into the amplifier circuit of the negative feedback amplifier is such that the level of that signal supplied to the transmission link connected to the output of the amplifier and the level of message signals supplied to that link are of the same order when the gain of the amplifier circuit is normal.

According to a feature of the present invention, in a telecommunication system which is of the kind specified and which employs a plurality of said relay stations, each said relay station is provided with means to inject a signal of predetermined amplitude into the amplifier circuit of a negative feedback amplifier which is in the transmission channel between the terminal stations, each signal being at least characteristic of a different one of the relay stations and the position in the amplifier circuit of a negative feedback amplifier at which the appropriate characteristic signal is arranged to be injected being such that the level of that signal which is supplied to the transmission link connected to the output of the negative feedback amplifier increases as the gain of the amplifier circuit decreases and at a higher rate than the rate at which the amplification of message signals by the negative feedback amplifier is reduced as the said gain decreases, and the terminal station that is arranged to receive signals passed over the said channel is provided with means which is adapted to respond selectively to an increase in level of any one of the characteristic signals received thereby, which increase is relative to a predetermined reference level, and to indicate by its selective response to any particular one of those signals that at the relay station of which that particular signal is characteristic, the gain of the amplifier circuit of the negative feedback amplifier in the transmission channel has decreased.

The electric message signals passed over the said channel may be combined in frequency division multiplex with other message signals for the purpose of being transmitted between the terminal stations.

According, therefore, to another feature of the present invention, in a telecommunication system which is of the kind specified and in which electric message signals are passed between the terminal stations over a plurality of channels in frequency division multiplex, the relay station, or at least one of the relay stations if there are more than one, is provided with means to inject a signal of predetermined amplitude into the amplifier circuit of the negative feedback amplifier at that relay station, which amplifier is common to some, if not all, of the transmission channels whereby electric message signals may be passed from one terminal station to the other terminal station, the signal being at least characteristic of the relay station and the position in the amplifier circuit of that common amplifier at which the signal is arranged to be injected being such that the level of that signal which is supplied to the transmission link connected to the output of the common amplifier increases as the gain of the amplifier circuit decreases and at a higher rate than the rate at which the amplification of message signals by the common amplifier is reduced as the said gain decreases, and the terminal station that is arranged to receive message signals passed over the said channels by way of the common amplifier is provided with means which is adapted to respond to an increase in level of the characteristic signal received thereby, which increase is relative to a predetermined reference level, and to thus indicate that at the particular relay station of which that signal is characteristic the gain of the amplifier circuit of the said common amplifier has decreased.

The relay station, or each relay station if there are more than one, may have a separate negative feedback amplifier for each direction of communication between the terminal stations and the negative feedback amplifiers at any relay station of the system may be arranged to have the same characteristic signal injected into their amplifier circuits. Preferably the characteristic signal supplied to the negative feedback amplifiers at any relay station of the system is derived from a common source at that relay station. This common source may comprise an electric oscillator having an output impedance which is larger at the working frequency of the oscillator than at the frequencies at which message signals are passed over the transmission channel or any one of the transmission channels if there are more than one. In addition, it may be arranged that the characteristic signal derived from the oscillator is injected into the amplifier circuit of each negative feedback amplifier through a separate path having an impedance which is large relative to the output impedance of the oscillator at its working frequency.

One example of a telecommunication system in accordance with the present invention will now be described with reference to the three figures of the accompanying drawings in which FIGURE 1 shows the system diagrammatically;

Figure 1:
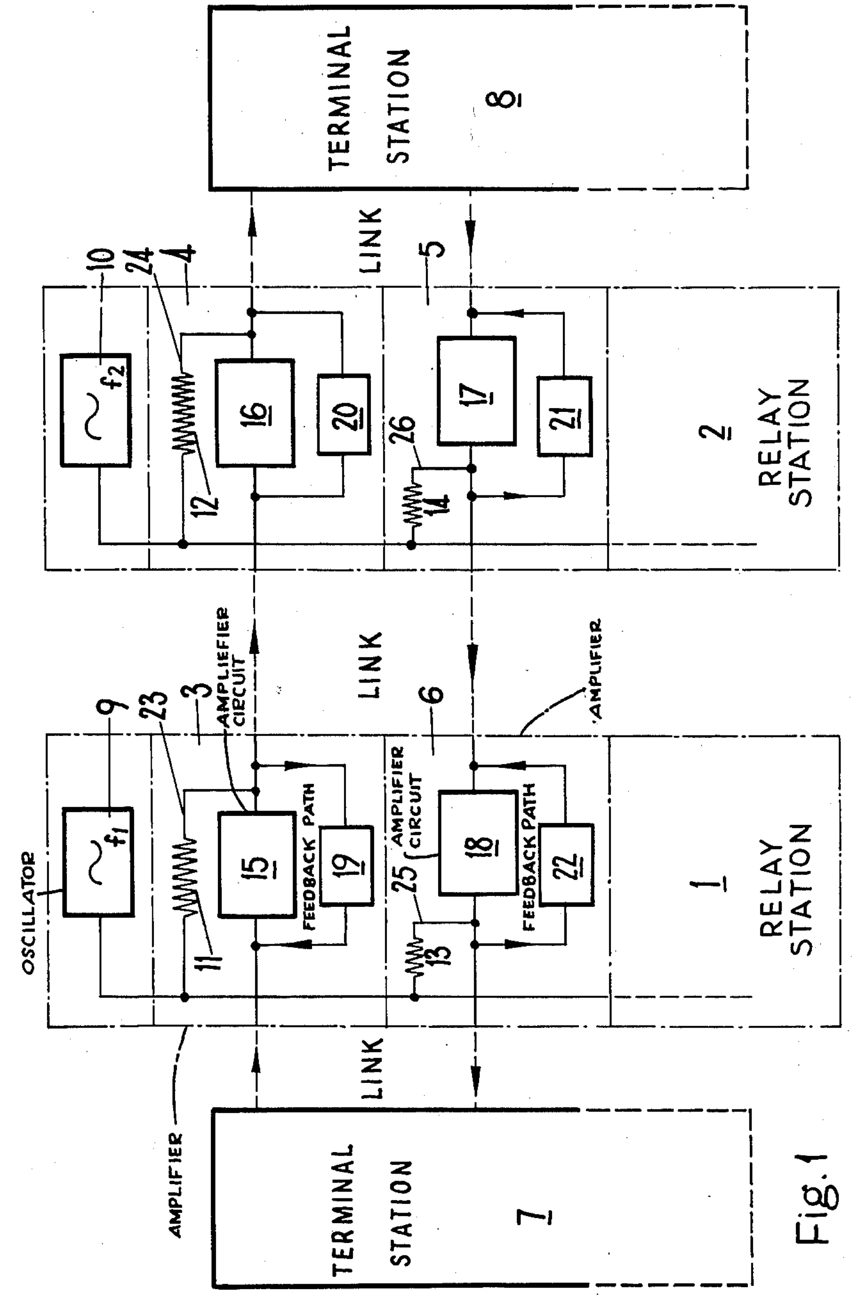

Referring to FIGURE 1 of the drawings, the telecommunication system there illustrated is arranged to provide a plurality of transmission channels, which may be speech channels, for each direction of communication between two terminal stations 7 and 8, and two relay stations for amplifying signals passed over the transmission channels. The relay stations 1 and 2 are coupled in a chain between the two terminal stations by means of cable links and electric message signals are passed between the terminal stations over the cable links as modulations of relatively high carrier frequencies. The transmission channels are arranged in frequency division multiplex, each channel occupying a separate band of frequencies within the range of frequencies used for communication between the terminal stations 7 and 8.

Each of the relay stations 1 and 2 has two negative feedback amplifiers 3 and 6 and 4 and 5 respectively. Of these amplifiers, the amplifiers 3 and 4 are common to all the transmission channels whereby message signals may be passed from terminal station 7 to terminal station 8 and the amplifiers 5 and 6 are common to all the transmission channels whereby message signals may be passed from terminal station 8 to terminal station 7.

Each of the negative feedback amplifiers 3, 4, 5 and 6 comprises an amplifier circuit 15, 16, 17 or 18 respectively and a feedback path 19, 20, 21 or 22 respectively. Each amplifier circuit, such as the circuit 15, has the associated feedback path 19 connected between its output and its input. The amplifier circuits 15 to 18 employ active elements such as electronic valves or transistors. The feedback paths comprise passive elements such as resistors and each acts to feed back degeneratively to the input of the associated amplifier circuit a portion of any signal supplied by that amplifier circuit to its output.

Each of the relay stations 1 and 2 is provided with supervisory equipment whereby the location of a faulty negative feedback amplifier 3, 4, 5 or 6 in any one of the transmission channels is automatically indicated to the terminal station 7 or 8 that is arranged to receive signals passed over that channel. This supervisory equipment comprises, in respect of each relay station 1 and 2, an electric oscillator 9 or 10 respectively which has its output connected across the output of each amplifier circuit 15 and 18 or 16 and 17 in its relay station and which is arranged to operate at a predetermined frequency that is different for each relay station. Thus the oscillators 9 and 10 operate to generate supervisory signals having frequencies F1 and F2 respectively which are both outside the range of frequencies used for communication between the terminal stations and which, in the present embodiment, are both slightly lower than the frequencies of this range. For example, if the said range of frequencies is from 60 kilocycles per second upwards, the frequencies F1 and F2 may have different values in the frequency range 45 to 50 kilocycles per second, such as 45 kilocycles per second and 46 kilocycles per second.

Each of the oscillators 9 and 10 has a tuned output circuit (not shown) so that its output impedance at the working frequency F1 or F2 is larger than at the frequencies in the range used for communication between the terminal stations 7 and 8. The oscillators 9 and 10 have their outputs connected to each of the associated negative feedback amplifiers 3 and 6 and 4 and 5 by separate paths 23 and 25 and 24 and 26 which include resistors 11 and 13 and 12 and 14 respectively. In the above manner, it is arranged that the level of the supervisory signal of frequency F1 or F2 supplied by the oscillator 9 or 10 to its associated amplifiers 3 and 6 or 4 and 5 is of the same order as the signals that may normally occur in respect of any transmission channel at the position in the amplifier circuit 15, 16, 17 or 18 of any one of those associated amplifiers to which position the supervisory signal of frequency F1 or F2 is supplied. This ensures that the supervisory signals are at a satisfactory high level with respect to noise but not at such a high level that the resulting intermodulation noise produced in the amplifiers 3 to 6 is objectionable. Although the paths 23 to 26 provide interconnections between the outputs of the amplifiers 3 and 6, and 4 and 5 at each relay station 1 and 2, the value of the resistance 11, 12, 13 or 14 in each of these paths is such that cross talk between the transmission channels for each direction of communication between the terminal stations is negligible.

It may be shown that the amplification of intelligence signals which correspond to any one of the transmission channels and which are supplied to the input of any one of the negative feedback amplifiers 3 to 6, such as the amplifier 6, is given by the expression $\mu/(1+\mu\beta)$ where $\mu$ is the gain of the amplifier circuit 18 of the amplifier and $\beta$ is the portion of the output from that amplifier circuit that is fed back degeneratively through the feedback path 22. It may also be shown that if the level of the supervisory signal that is supplied to the output of the amplifier circuit 15, 16, 17 or 18 of any one of the amplifiers 3 to 6 is A amps, then the level of that supervisory signal appearing at the output of that amplifier will be substantially proportional to $A/(1+\mu\beta)$ amps. Typical values for $\mu$ and $\beta$ are 5000 and 0.01 respectively. It will be appreciated that with these values, only about 2% of A amps normally appears at the output of the amplifier 6, say, and the amplification of electric signals supplied to the input of that amplifier is about 100.

In practice, the factor $\beta$ is substantially constant with respect to time but the factor $\mu$ is subject to appreciable change due to the deterioration with time of the thermionic valves or transistors which determine its value. Consequently the gain $\mu$ of the amplifier circuit 18 of the amplifier 6 considered above may fall from 5000 to 500 towards the end of the useful life of one or more of the active elements in that amplifier circuit. The effect of this considerable reduction in the value of $\mu$ upon the overall performance of the amplifier 6 is negligible as the amplification to which input signals are submitted is still more than 80. However, the level of the supervisory signal of frequency F1 appearing at the output of the amplifier 6 is increased by more than eight times to about 17% of A amps. This increase in level of the supervisory signal affords a clear indication at the terminal station 7 that one of the negative feedback amplifiers 5 and 6 that are common to the transmission channels over which the increased supervisory signal is received by that terminal station requires maintenance if a breakdown is to be avoided, while the particular frequency F1 of that supervisory signal characterises the relay station 1 at which that one of the amplifiers 6 is located.

Figure 2:
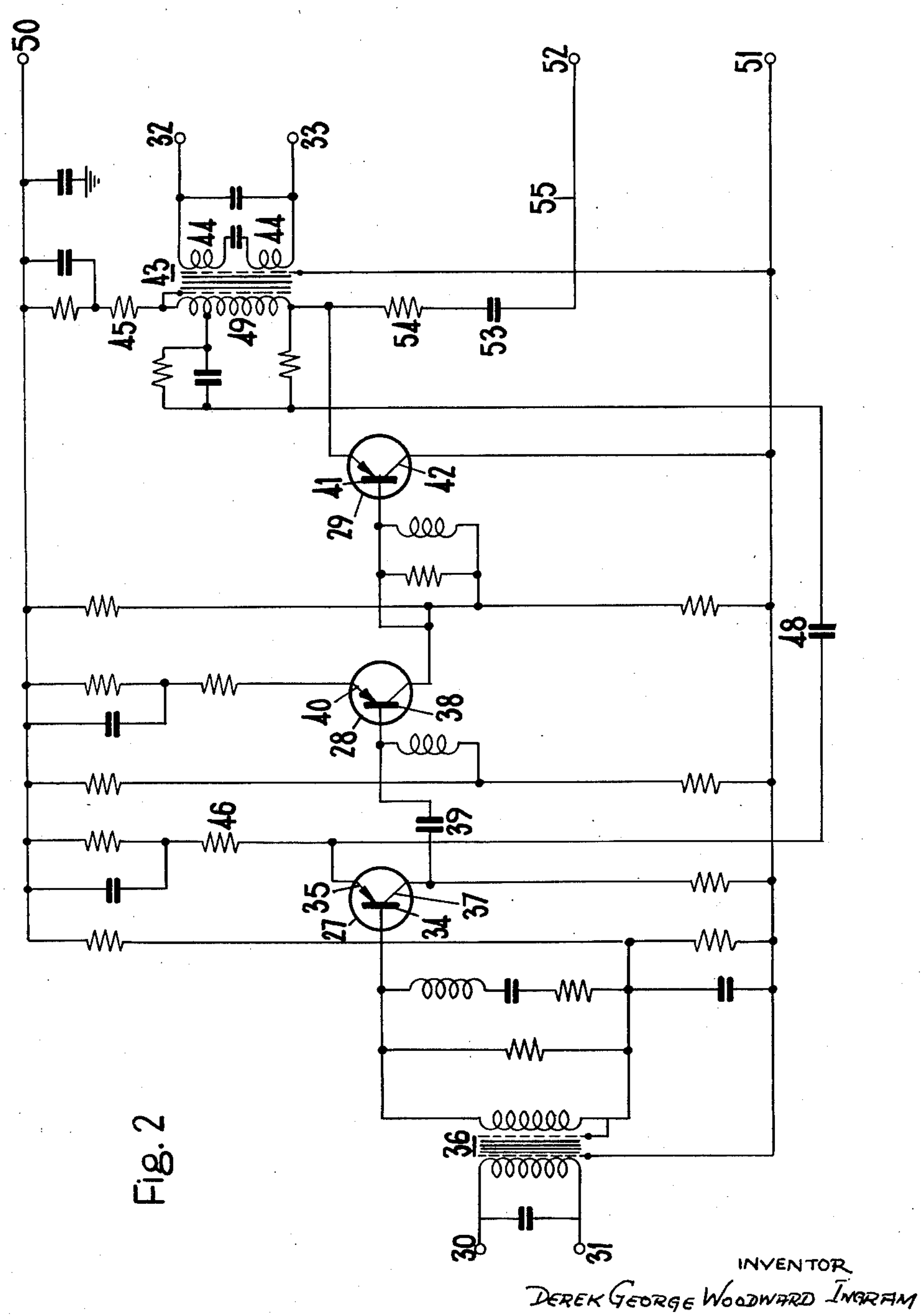
FIGURE 2 shows the electrical circuit of a negative feedback amplifier.

The electrical circuit of each of the negative feedback amplifiers 3 to 6 may be as shown in FIGURE 2. This circuit includes a three stage amplifier circuit which employs p-n-p type junction transistors 27, 28 and 29 and which is arranged to amplify electric signals supplied to the input terminals 30 and 31 of the amplifier and to supply the amplified signals to the output terminals 32 and 33 of the amplifier. Thus the electric signals supplied to the terminals 30 and 31 are applied between the base electrode 34 and the emitter electrode 35 of the transistor 27 in the first stage of the amplifier circuit by way of an input transformer 36. The transistor 27 is connected in a grounded emitter configuration and has its collector electrode 37 coupled to the base electrode 38 of the transistor 28 by way of a capacitor 39. The amplified signals provided by the transistor 27 are applied between the base electrode 38 and emitter electrode 40 of the transistor 28 which is also connected in a grounded emitter configuration and are again amplified. These signals are then applied between the base electrode 41 and the collector electrode 42 of the transistor 29 which is connected in a grounded collector configuration, and are further amplified. The thus amplified signals are supplied to an output transformer 43 which has its secondary winding 44 connected across the output terminals 32 and 33.

The feedback path of the amplifier includes a capacitor 48 and is connected between a tapping on the primary winding 49 of the output transformer 43 and the emitter electrode 35 of the transistor 27. It is thus arranged that a voltage, which is dependent both upon the voltage developed across the winding 49 and upon the current through a resistor 45 in series with that winding, is applied across a resistor 46 in the emitter circuit of the transistor 27 and is thus fed back degeneratively to the input of the first stage of the amplifier circuit.

The amplifier has terminals 50 and 51 which are for connection to the positive and negative terminals respectively of a power supply suitable for operating the transistors 27, 28 and 29. An additional terminal 52 is for connection with the terminal 50 to the output circuit of the appropriate one of the electric oscillators 9 and 10 of FIGURE 1. A supervisory signal of the frequency F1 or F2 is thus arranged to be injected into the output of the amplifier circuit by way of a path 55 which comprises a capacitor 53 and a resistor 54 and which corresponds to any one of the paths 23 to 26 of FIGURE 1. The capacitor 53 is provided to prevent the flow of direct current from the amplifier to an electric oscillator 9 or 10 connected to the terminals 52 and 50. The resistor 54 corresponds to one of the resistors 11 to 14 of FIGURE 1 and has a value of resistance, 1200 ohms, which is large relative to the impedance of the output circuit of the amplifier. It is thus arranged that when the amplifier is employed with a similar amplifier in one or other of the relay stations 1 and 2, there is negligible cross-talk between the transmission channels of these amplifiers due to the interconnection provided between the output circuits of these amplifiers by the paths 55 and the like.

The fall in gain of the amplifier circuit 15, 16, 17 or 18 of any one of the amplifiers 3 to 6 of the system shown in FIGURE 1 is usually very gradual.

One method of detecting such a fall in gain is to compare the received signal with a suitable reference signal. Thus if the transmission channels for any direction of communication had been divided between two or more negative feedback amplifiers (not shown), such a reference signal would be provided by the corresponding supervisory signal received over a parallel transmission channel by way of a different one of the said amplifiers. However, such an arrangement may not be completely satisfactory as this reference signal may itself be at an abnormal level although this is so improbable that it is unlikely to represent a serious objection.

Figure 3:
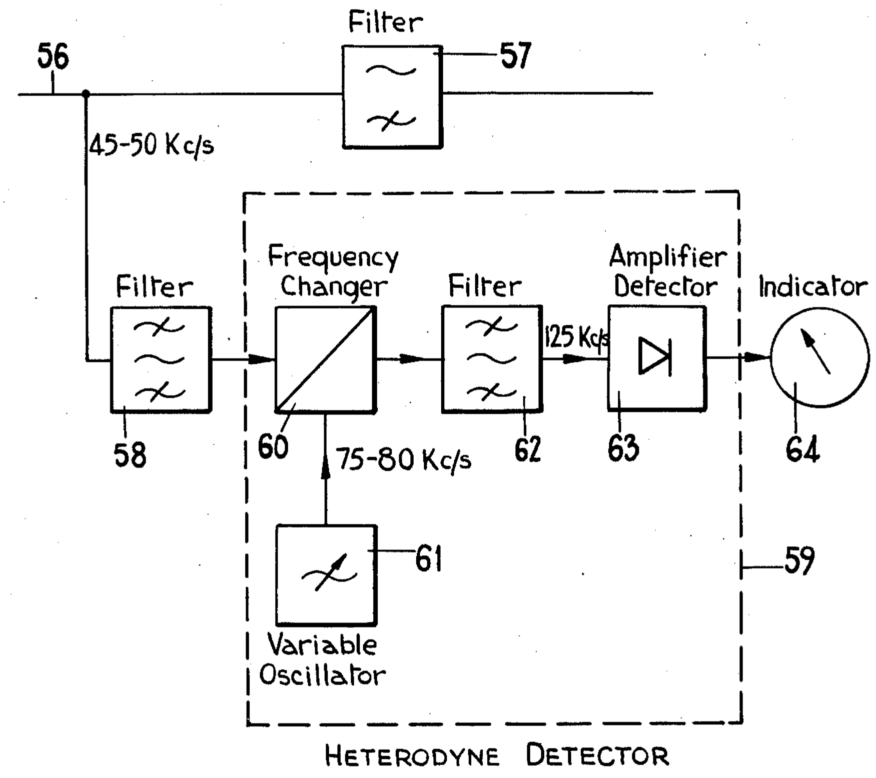
FIGURE 3 shows diagrammatically part of the electrical circuit of one of the terminal stations of FIGURE 1.

In the present embodiment each terminal station 7 and 8 is provided with identical level sensing means which is selectively responsive to the supervisory signals of frequencies F1 and F2. The level sensing means of the terminal station 8 is shown diagrammatically in FIGURE 3 to which reference should now be made.

Signals incoming to the terminal station 8 from the terminal station 7 are supplied over the path 56 to a high-pass filter 57 and to a band-pass filter 58. The filter 57 is arranged to pass signals having frequencies in the range used for communication between the terminal stations 7 and 8 to the demodulating equipment (not shown) in the terminal station 8 and to stop the supervisory signals. The filter 58 is arranged to pass only signals having frequencies within the range 45 to 50 kilocycles per second used for the supervisory signals.

Supervisory signals passed by the filter 58 are supplied to a heterodyne detector 59 which consists of a frequency changer 60, a variable oscillator 61, a crystal filter 62 and an amplifier-detector 63. The oscillator 61 is arranged to operate over the range of frequencies 75 to 80 kilocycles per second and is calibrated to facilitate its selective tuning to each frequency within that range that corresponds, as hereinafter described, to a different one of the supervisory signals. The filter 62 is arranged to pass only a very narrow band of frequencies in the region of 125 kilocycles per second. Consequently when say the level of the supervisory signal of frequency 46 kilocycles per second is to be examined, it is necessary for the oscillator 61 to be tuned to the frequency of 79 kilocycles per second in order that the frequency changer 60 shall produce an output signal having the frequency necessary for that signal to be passed by the filter 62 to the amplifier detector 63. The level of this output signal is indicative of the level of the appropriate supervisory signal so that after amplification and detection by the amplifier detector 63 it may be employed to produce an indication on a calibrated indicating device 64 which may conveniently be a direct current meter of the moving coil type.

The level of any one of the supervisory signals received by either terminal station 7 or 8 will fall to zero if the appropriate oscillator 9 or 10 fails or if the break occurs in one of the cable links between the relay stations 1 and 2. Thus if, for example, the oscillator 9 should fail, this condition is clearly indicated at both terminal stations 7 and 8 by the complete absence of the signal of frequency F1 in every transmission channel. If, however, a break occurs in, say, the cable link between the relay stations 1 and 2, then the terminal station 7 receives the supervisory signal of frequency F1 only and the terminal station 8 receives the signal of frequency F2 only.

From the foregoing it will be appreciated that a complete failure of any one of the amplifiers 3 to 6 is not necessary for a fault condition to be indicated to one of the terminal stations 7 and 8. Such a fault condition, which indicates the location of the negative feedback amplifier giving rise thereto, is usually provided before the actual amplification of electric signals by that amplifier undergoes an appreciable reduction so that steps may be taken to remedy the defect before the complete failure occurs.

It is not essential for the supervisory signals to be injected into the outputs of the amplifier circuits 15 to 18 of the negative feedback amplifiers 3 to 6 although this arrangement is preferred as it results in the greatest sensitivity, that is to say, the largest change in the level of the injected supervisory signal for any particular change in the level of the gain $\mu$ of any one of the amplifier circuits. The sensitivity falls off as the point of injection of the supervisory signal is moved through the amplifier circuit 15, 16, 17 or 18 towards the input of the amplifier 3, 4, 5 or 6.

Although the invention has been described in its application to a telecommunication system in which the relay stations 1 and 2 are coupled in a chain between the terminal stations 7 and 8 by cable links, this is not essential and radio links or other transmission links may be employed if so desired.

It should be understood that the invention is not restricted to telecommunication systems in which a separate negative feedback amplifier is used for signals passing in each direction between the terminal stations. Thus in an alternative arrangement, a single amplifier is employed at each relay station for transmission channels in both directions, it being arranged that the channels employed for passing signals in one direction lie within one band of frequencies such as 4 to 16 kilocycles per second and the channels employed for passing signals in the other direction lie within another band of frequencies such as 18 to 30 kilocycles per second. At each relay station, four frequency filter networks are arranged in a four terminal bridge circuit, the filters in one pair of diagonally opposite arms being arranged to pass only the one band of frequencies 4 to 16 kilocycles per second and the filters in the other two arms being arranged to stop only that band of frequencies 4 to 16 kilocycles per second. The negative feedback amplifier is connected across the bridge circuit between one pair of its opposite terminals and is supplied with a supervisory signal of a frequency 30.5 kilocycles per second, say, and the other pair of its opposite terminals are each connected to different transmission links. With such an arrangement, only the terminal station that is arranged to receive signals passed over the channels within the band of frequencies 18 to 30 kilocycles per second is able to receive the supervisory signal.

It will be appreciated that the invention is not restricted to frequency division multiplex arrangements and that it can also be employed in systems in which the message signals and the supervisory signals are combined in time division multiplex, or in systems in which a combination of frequency division multiplex and time division multiplex are employed.

I claim:

1. A repeater for a telecommunication system wherein there are provided a negative feedback amplifier having a predetermined operational frequency band and comprising an amplifier circuit having an input and an output; an output circuit connected to the output of the amplifier circuit and adapted to pass signals supplied to that output; a degenerative feedback circuit connected between said output circuit and the input of the amplifier circuit to feed back to that input a predetermined portion of signals supplied to said output circuit; the amplifier circuit, said output circuit and said feedback circuit comprising a loop circuit that provides a phase shift whereby a signal of frequency within said frequency band that is supplied into the loop circuit and the corresponding signal which is returned through that loop circuit and of which the amplitude depends upon the gain of the amplifier circuit, are substantially opposed in phase; a source of supervisory signal of predetermined amplitude and of a frequency that is within said frequency band; and means connecting said source and said loop circuit at the output of the amplifier circuit to supply the supervisory signal into said loop circuit at the output of the amplifier circuit whereby the amplitude of the resultant signal of said frequency supplied by said output circuit is determined by the amplitude of the corresponding signal that is returned through said loop circuit to the output of the amplifier circuit and increases as the gain of the amplifier circuit decreases.

2. A repeater according to claim 1 wherein the source of supervisory signal supplies an alternating current as said supervisory signal and wherein circuit means comprising said source and resistance in series is connected across the output of the amplifier circuit.

3. A repeater for a telecommunication system comprising an amplifier circuit having an input, an output and a plurality of transistor amplifier stages connected in cascade between the input and the output, an output circuit connected to the output of the amplifier circuit and adapted to pass intelligence signals supplied to that output, a load circuit which is incorporated in said output circuit and which is connected across the output of the amplifier circuit, circuit means which comprises in series resistance and a source of alternating current of predetermined amplitude and of predetermined frequency and which is connected across said load circuit and therefore also across the output of the amplifier circuit, and a degenerative feedback circuit connected between said load circuit and the input of the amplifier circuit to feed back degeneratively to that input a predetermined portion of signals supplied to that load circuit, said feedback circuit, said output circuit and the amplifier circuit comprising a loop circuit that provides a phase shift such that the current of said frequency which is fed back thereby to the output of the amplifier circuit and the amplitude of which is dependent upon the gain of that amplifier circuit is substantially in phase opposition to the current of said frequency supplied by said source whereby the amplitude of the current of said frequency supplied by said output circuit is caused to increase as the gain of the amplifier circuit decreases.

4. A relay station for a telecommunication system comprising first and second repeaters which are for passing signals in two directions through that station, each repeater comprising an amplifier circuit having an input, an output and a plurality of transistor amplifier stages connected in cascade between the input and the output, an output circuit connected to the output of the amplifier circuit and adapted to pass intelligence signals supplied to that output, a load circuit which is incorporated in said output circuit and which is connected across the output of the amplifier circuit, circuit means which comprises in series resistance and a source of alternating current of predetermined amplitude and of predetermined frequency and which is connected across said load circuit and therefore also across the output of the amplifier circuit and a degenerative feedback circuit connected between said load circuit and the input of the amplifier circuit to feed back degeneratively to that input a predetermined portion of signals supplied to that load circuit, said feedback circuit, said output circuit and the amplifier circuit comprising a loop circuit that provides a phase shift such that the current of said frequency which is fed back thereby to the output of the amplifier circuit and the amplitude of which is dependent upon the gain of that amplifier circuit is substantially in phase opposition to the current of said frequency supplied by said source whereby the amplitude of the current of said frequency supplied by said output circuit is caused to increase as the gain of the amplifier circuit decreases.

5. A relay station according to claim 4 wherein both repeaters have the same source of alternating current of predetermined amplitude and predetermined frequency.

6. A telecommunication system comprising sending and receiving terminal stations, a transmission channel connecting said stations, a plurality of repeaters included in said channel and spaced at intervals therealong; each repeater incorporating a negative feedback amplifier having a predetermined operational frequency band and comprising an amplifier circuit having an input and an output, an output circuit connected to the output of the amplifier circuit and adapted to pass signals supplied to that output and a degenerative feedback circuit connected between said output circuit and the input of the amplifier circuit to feed back to that input a predetermined portion of signals supplied to said output circuit, the amplifier circuit, said output circuit and said feedback circuit comprising a loop circuit that provides a phase shift whereby a signal of frequency within said frequency band that is supplied into the loop circuit and the corresponding signal which is returned through that loop circuit and the amplitude of which depends upon the gain of the amplifier circuit are substantially opposed in phase, a source of supervisory signal of predetermined amplitude and of a frequency that is within said frequency band and is different for each said repeater, and means connecting said source and said loop circuit at the output of the amplifier circuit to supply the supervisory signal into said loop circuit at the output of the amplifier circuit whereby the amplitude of the resultant signal of said frequency supplied by said output circuit is determined by the amplitude of the corresponding signal that is returned through said loop circuit to the output of the amplifier circuit and increases as the gain of the amplifier circuit decreases, and a meter at said receiving station adapted to be connected to said channel and to measure each said resultant signal transmitted by said channel.

7. A telecommunications system according to claim 6 wherein the meter comprises an indicator adapted to indicate the value of an electric current supplied thereto and a heterodyne detector circuit which includes variable frequency means to facilitate the selecting of any one of the resultant signals transmitted by the channel and which is adapted to supply to said indicator an electric current of value dependent upon the level of any selected one of said resultant signals that are received over said channel.

8. A telecommunications system comprising sending and receiving terminal stations, a pair of one-way transmission channels respectively connecting said sending and receiving terminal stations to form a two-way system and including a plurality of one-way repeaters spaced therein; each repeater comprising an amplifier circuit having an input, an output and a plurality of transistor amplifier stages connected in cascade between the input and the output, an output circuit connected to the output of the amplifier circuit and adapted to pass intelligence signals supplied to that output, a load circuit which is incorporated in said output circuit and which is connected across the output of the amplifier circuit, circuit means which comprises in series resistance and a source of alternating current of predetermined amplitude and of predetermined frequency that is connected across said load circuit and therefore also across the output of the amplifier circuit and a degenerative feedback circuit connected between said load circuit and the input of the amplifier circuit to feed back degeneratively to that input a predetermined portion of signals supplied to that load circuit, said feedback circuit, said output circuit and the amplifier circuit comprising a loop circuit that provides a phase shift such that the current of said frequency which is fed back thereby to the output of the amplifier circuit and the amplitude of which is dependent upon the gain of that amplifier circuit is substantially in phase opposition to the current of said frequency supplied by said source whereby the amplitude of the resultant current of said frequency supplied by said output circuit is caused to increase as the gain of the amplifier circuit decreases, and a meter at each terminal station connected to the particular one of said channels over which signals are received at that terminal station and adapted to measure each said resultant current transmitted by that particular channel.

References Cited in the file of this patent

UNITED STATES PATENTS

| | | |
|---|---|---|
| 2,066,333 | Caruthers | Jan. 5, 1937 |
| 2,580,097 | Ilgenfritz | Dec. 25, 1951 |
| 2,784,264 | Hansen | Mar. 5, 1957 |
| 2,951,128 | Kingsbury | Aug. 30, 1960 |